(12) United States Patent
Saintigny et al.

(10) Patent No.: US 9,657,161 B2
(45) Date of Patent: May 23, 2017

(54) TIRE TREAD WITH IMPROVED WEAR

(71) Applicants: Compagnie Generale des Etablissements Michelin, Clermont-Ferrand (FR); Michelin Recherche et Technique S.A., Granges-Paccot (CH)

(72) Inventors: Xavier Saintigny, Greer, SC (US); Olivier Piffard, Mauldin, SC (US)

(73) Assignees: Compagnie Generale Des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/888,696

(22) PCT Filed: May 5, 2014

(86) PCT No.: PCT/US2014/036834
§ 371 (c)(1),
(2) Date: Nov. 2, 2015

(87) PCT Pub. No.: WO2014/179806
PCT Pub. Date: Nov. 6, 2014

(65) Prior Publication Data
US 2016/0130427 A1     May 12, 2016

Related U.S. Application Data

(60) Provisional application No. 61/819,323, filed on May 3, 2013.

(51) Int. Cl.
*C08L 9/00*       (2006.01)
*B60C 1/00*       (2006.01)

(52) U.S. Cl.
CPC .............. *C08L 9/00* (2013.01); *B60C 1/0016* (2013.04)

(58) Field of Classification Search
CPC ................................. C08L 9/00; B60C 1/0016
USPC .......................................................... 524/474
See application file for complete search history.

(56) References Cited

U.S. PATENT DOCUMENTS

| 2011/0190416 A1* | 8/2011 | Maesaka | ............... B60C 1/0016 523/155 |
| 2011/0263750 A1* | 10/2011 | Lopitaux | ............... B60C 1/0016 523/156 |

FOREIGN PATENT DOCUMENTS

| WO | WO 2013040425 A1 * | 3/2013 | ........... B60C 1/0016 |
| WO | WO2013040425 A1 | 3/2013 | |

OTHER PUBLICATIONS

International Search Report and Written Opinion dated Sep. 9, 2014.

* cited by examiner

*Primary Examiner* — Ling Choi
*Assistant Examiner* — Ronald Grinsted
(74) *Attorney, Agent, or Firm* — Frank J. Campigotto

(57) ABSTRACT

Tire treads and tires having such tire treads are included, such treads manufactured with a rubber composition that includes mostly, if not entirely, a polybutadiene rubber having cis-1,4 bond content of at least 95%. The rubber composition further includes between 60 phr and 95 phr of a plasticizing resin having a Tg of at least 25° C. and between 0 phr and 15 phr of a liquid plasticizer. Additionally the rubber composition is reinforced with at least 90 phr of a silica reinforcing filler. Alternatively, in some embodiments, the rubber composition may be reinforced with an organic filler, an inorganic filler or combinations thereof. In some of these embodiments, the rubber composition includes at least 90 phr of such reinforcing filler.

16 Claims, No Drawings

TIRE TREAD WITH IMPROVED WEAR

BACKGROUND OF THE INVENTION

Field of the Invention

This invention relates generally rubber compositions and more specifically to rubber compositions useful in the manufacture of tires.

Description of the Related Art

Tire designers strive to improve the way tires operate and handle on the road by seeking, for example, improvements as to how well tires are able to grip the road when the road is dry, wet or covered with ice and/or snow. They may also seek improvements as to how comfortable the ride is for the driver and passengers including, for example, the noise level and the smoothness of the ride. Tire designers may also seek improvements in those areas that affect the costs associated with operating tires including tire wear and rolling resistance since a tire with a high wear rate will have to be replaced sooner and a tire with high rolling resistance will cause increased fuel consumption.

While tire designers would like to achieve improvements in all of these areas, it is also known that they must typically compromise on certain characteristics associated with the tire they are designing. Often changing a tire design to improve one characteristic of the tire will often result in a compromise; i.e., an offsetting decline in another tire characteristic. One such comprise exists between tire wear and wet braking. It is known, for example, that tire wear may be improved by increasing the amount of polybutadiene blended into the tread's rubber composition but that typically results in the resulting compromise of decreased wet braking performance, which is known to be improved by decreasing the polybutadiene content of the tire tread.

Tire designers and those conducting research in the tire industry search for materials and tire structures that can break some of the known compromises. It would be desirable to provide new tire designs that break other known compromises.

SUMMARY OF THE INVENTION

Particular embodiments of the present invention include a tire tread that is made of a rubber composition that is based upon a cross-linkable rubber composition that includes, per 100 parts by weight of rubber (phr) of rubber, 100 phr of a polybutadiene rubber having a cis-1,4 bond content of at least 95%. The rubber composition further includes between 60 phr and 95 phr of a plasticizing resin having a Tg of at least 25° C. and between 0 phr and 15 phr of a liquid plasticizer. Additionally the rubber composition is reinforced with at least 90 phr of a silica reinforcing filler.

Alternatively, in some embodiments, the rubber composition may be reinforced with an organic filler, an inorganic filler or combinations thereof. In some of these embodiments, the rubber composition includes at least 90 phr of such reinforcing filler.

In some embodiments, the rubber composition may have a glass transition temperature of between −35° C. and 0° C.

DETAILED DESCRIPTION OF PARTICULAR EMBODIMENTS

Particular embodiments of the present invention include tire treads and methods of their making having improved traction properties while surprisingly still maintaining good wear rates. It is this improvement in both the traction properties and the wear properties of the tires that provide a true break in the typical compromise faced by tire designers. This break in the compromise was achieved by manufacturing treads from a rubber composition including, inter alia, a plasticizing resin and a rubber component made up entirely of or almost entirely of a polybutadiene rubber having a high cis-1,4 bond content.

While the rubber compositions disclosed herein may be useful for a broad range of tire treads, they are particularly useful in particular embodiments of the present invention as all-weather tires and/or summer tires passenger cars and light trucks.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubber(s) in the composition.

As used herein, elastomer and rubber are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon the constituents comprising the cross-linkable rubber composition.

As is known generally, a tire tread is the road-contacting portion of a vehicle tire that extends circumferentially about the tire. It is designed to provide the handling characteristics required by the vehicle; e.g., traction, dry braking, wet braking, cornering and so forth—all being preferably provided with a minimum amount of noise being generated and at a low rolling resistance.

Treads of the type that are disclosed herein include tread elements that are the structural features of the tread that contact the ground. Such structural features may be of any type or shape, examples of which include tread blocks and tread ribs. Tread blocks have a perimeter defined by one or more grooves that create an isolated structure in the tread while a rib runs substantially in the longitudinal (circumferential) direction and is not interrupted by any grooves that run in the substantially lateral direction or any other grooves that are oblique thereto.

The radially outermost faces of these tread elements make up the contact surface of the tire tread—the actual surface area of the tire tread that is adapted for making contact with the road as the tire rotates. The total contact surface of the tire tread is therefore the total surface area of all the radially outermost faces of the tread elements that are adapted for making contact with the road.

As noted above, the rubber compositions useful for particular embodiments of the present invention include the rubber component made up entirely or almost entirely of a polybutadiene having a high cis-1,4 bond content. Polybutadiene rubber is a well-known rubber that is made by polymerizing the 1,3-butadiene monomer (typically homopolymerization) in a solution polymerization process using suitable catalysts as known to those skilled in the art. Because of the two double bonds present in the butadiene monomer, the resulting polybutadiene may include three different forms: cis-1,4, trans-1,4 and vinyl-1,2 polybutadiene. The cis-1,4 and trans-1,4 elastomers are formed by the monomers connecting end-to-end while the vinyl-1,2 elastomer is formed by the monomers connecting between the ends of the monomer. The catalyst selection and the temperature of the process are known as the variables typically used to control the cis-1,4 bond content of the polybutadiene.

In particular embodiments of the present invention, the polybutadiene is produced using a neodymium catalyst and the resultant polybutadiene may be characterized as having a cis-1,4 bond content of at least 95% and in other embodiments of at least 96%, at least 98%, between 96% and 99.5%, between 96% and 99% or between 96% and 99.5%. Other catalysts such as cobalt and nickel may also be used and the method of making such polybutadiene is not a part of this invention as such materials are well known in the industry. An acceptable polybutadiene suitable for use with the rubber compositions disclosed herein include, for example, CB22 that is marketed by Lanxess.

While embodiments of the present invention include the use of a rubber composition having 100 phr of such high cis-1,4 bond content polybutadiene, particular embodiments may include up to 5 phr of a secondary rubber component or alternatively, between 1 phr and 5 phr or between 1 phr and 3 phr of the secondary rubber component.

Such secondary rubber components may include, for example, one or more highly unsaturated diene elastomers (diene elastomers having a content of units of diene origin (conjugated diene) that is greater than 50 mol. %) such as synthetic polyisoprenes (IR), natural rubber (NR), butadiene copolymers, isoprene copolymers and mixtures of these elastomers. Such copolymers include butadiene/styrene copolymers (SBR), isoprene/butadiene copolymers (BIR), isoprene/styrene copolymers (SIR) and isoprene/butadiene/styrene copolymers (SBIR). In particular embodiments, the secondary rubber component is natural rubber.

In addition to the rubber, the rubber composition disclosed herein may further include reinforcing filler. Reinforcing fillers are added to rubber compositions to, inter alia, improve their tensile strength and wear resistance. Particular embodiments of the present invention include treads that are made of a rubber composition that includes fairly high loadings of inorganic reinforcing fillers such as silica with which a coupling agent is typically associated. Particular embodiments may also include treads made from rubber compositions that include carbon black, inorganic fillers or combinations thereof.

Carbon black, although a useful reinforcing filler in many tire applications, is explicitly excluded from some embodiments of the rubber compositions disclosed herein except, for some embodiments, very small quantities that may be included to provide coloring (black) to the tire composition and/or UV protection. Such benefits may be obtained by adding at least 0.5 phr but no more than 20 phr of carbon black or alternatively, less than 10 phr, less than 5 phr or between 0.5 phr and 10 phr of carbon black or between 0.5 and 5 phr.

Inorganic reinforcing fillers include any inorganic or mineral fillers, whatever its color or origin (natural or synthetic), that are capable without any other means, other than an intermediate coupling agent, or reinforcing a rubber composition intended for the manufacture of tires. Such inorganic reinforcing fillers can replace conventional tire-grade carbon blacks, in whole or in part, in a rubber composition intended for the manufacture of tires. Typically such fillers may be characterized as having the presence of hydroxyl (—OH) groups on its surface.

Inorganic reinforcing fillers may take many useful forms including, for example, as powder, microbeads, granules, balls and/or any other suitable form as well as mixtures thereof. Examples of suitable inorganic reinforcing fillers include mineral fillers of the siliceous type, such as silica ($SiO_2$), of the aluminous type, such as alumina ($AlO_3$) or combinations thereof.

Useful silica reinforcing fillers known in the art include fumed, precipitated and/or highly dispersible silica (known as "HD" silica). Examples of highly dispersible silicas include Ultrasil 7000 and Ultrasil 7005 from Degussa, the silicas Zeosil 1165MP, 1135MP and 1115MP from Rhodia, the silica Hi-Sil EZ150G from PPG and the silicas Zeopol 8715, 8745 and 8755 from Huber. In particular embodiments, the silica may have a BET surface area, for example, of between 60 $m^2/g$ and 250 $m^2/g$ or alternatively between 80 $m^2/g$ and 230 $m^2/g$.

Examples of useful reinforcing aluminas are the aluminas Baikalox A125 or CR125 from Baikowski, APA-100RDX from Condea, Aluminoxid C from Degussa or AKP-G015 from Sumitomo Chemicals.

For coupling the inorganic reinforcing filler to the diene elastomer, a coupling agent that is at least bifunctional provides a sufficient chemical and/or physical connection between the inorganic reinforcement filler and the diene elastomer. Examples of such coupling agents include bifunctional organosilanes or polyorganosiloxanes. Such coupling agents and their use are well known in the art. The coupling agent may optionally be grafted beforehand onto the diene elastomer or onto the inorganic reinforcing filler as is known. Otherwise it may be mixed into the rubber composition in its free or non-grafted state. One useful coupling agent is X 50-S, a 50-50 blend by weight of Si69 (the active ingredient) and N330 carbon black, available from Evonik Degussa.

In the rubber compositions according to the invention, the coupling agent may be included at any suitable amount for the given application, examples of which are between 2 phr and 15 phr or alternatively, between 2 phr and 12 phr or between 3 phr and 10 phr. It is generally desirable to minimize its use. In particular embodiments, the amount of coupling agent may represent between 0.5 and 15 wt. % relative to the total weight of the silica filler. In the case for example of tire treads for passenger vehicles, the coupling agent may be less than 12 wt. % or even less than 10 wt. % or 8 wt. % relative to the total weight of the silica filler.

For those embodiments that include carbon black in the rubber compositions in quantities greater than the very small quantities mentioned above, any of the carbon blacks that may be known to be useful in tread applications would be suitable. In such embodiments, the carbon black may be used as the sole filler or may be mixed with other reinforcing fillers, such as silica and/or other inorganic reinforcing fillers.

Suitable carbon blacks include, for example, those of the type HAF, ISAF and SAF, conventionally used in tires. Reinforcing blacks of ASTM grade series 100, 200 and/or 300 are suitable such as, for example, the blacks N115, N134, N234, N330, N339, N347, N375 or alternatively, depending on the intended application, blacks of higher ASTM grade series such as N660, N683 and N772.

In particular embodiments, the reinforcing filler is included in the rubber compositions disclosed herein at a fairly high loading for such tread applications because it is the high loading, coupled with the use of the high cis-1,4 bond content polybutadiene and the plasticizing resin, that provides the desired characteristics of the treads and tires of the present invention. Indeed, the amount of reinforcing filler, be it an organic filler, inorganic filler or combinations thereof, added to the rubber compositions may include between 90 phr and 150 phr of the filler or alternatively, between 90 phr and 130 phr, between 95 phr and 130 phr, between 95 phr and 150 phr or between 100 phr and 120 phr of the filler. In particular embodiments the reinforcing filler may be limited to a silica, especially in particular embodiments to a highly dispersible silica.

As noted above, particular embodiments of the present invention further include a plasticizing system that includes a high Tg resin and optionally a plasticizing liquid in addition to the resin. The plasticizing system may provide both an improvement to the processability of the rubber mix and/or a means for adjusting the rubber composition's glass transition temperature and/or its rigidity. In particular embodiments, effective amounts of the plasticizing system may be, for example, between 50 phr and 120 phr or alternatively between 60 phr and 110 phr or between 70 phr and 120 phr.

Suitable plasticizing liquids may include any liquid known for its plasticizing properties with diene elastomers. At room temperature (23° C.), these liquid plasticizers or these oils of varying viscosity are liquid as opposed to the resins that are solid. Examples include those derived from petroleum stocks, those having a vegetable base and combinations thereof. Examples of oils that are petroleum based include aromatic oils, paraffinic oils, naphthenic oils, MES oils, TDAE oils and so forth as known in the industry. Also known are liquid diene polymers, the polyolefin oils, ether plasticizers, ester plasticizers, phosphate plasticizers, sulfonate plasticizers and combinations of liquid plasticizers.

Examples of suitable vegetable oils include sunflower oil, soybean oil, safflower oil, corn oil, linseed oil and cotton seed oil. These oils and other such vegetable oils may be used singularly or in combination. In some embodiments, sunflower oil having a high oleic acid content (at least 70 weight percent or alternatively, at least 80 weight percent) is useful, an example being AGRI-PURE 80, available from Cargill with offices in Minneapolis, Minn. In particular embodiments of the present invention, the selection of a suitable plasticizing liquid is limited to a vegetable oil having a high oleic acid content.

The amount of plasticizing liquid useful in any particular embodiment of the present invention depends upon the particular circumstances and the desired result. In general, for example, the plasticizing liquid may be present in the rubber composition in an amount of between 0 phr and 20 phr or alternatively, between 0 phr and 15 phr, between 0 phr and 10 phr, between 5 phr and 10 phr or between 5 phr and 15 phr of the plasticizing liquid. It is noted that in some embodiments, use of any plasticizing liquid may reduce the desired properties of the rubber articles formed from such rubber compositions and therefore, in some embodiments, no plasticizing liquid is used.

A plasticizing hydrocarbon resin is a hydrocarbon compound that is solid at ambient temperature (e.g., 23° C.) as opposed to a liquid plasticizing compound, such as a plasticizing oil. Additionally a plasticizing hydrocarbon resin is compatible, i.e., miscible, with the rubber composition with which the resin is mixed at a concentration that allows the resin to act as a true plasticizing agent, e.g., at a concentration that is typically at least 5 phr (parts per hundred parts rubber by weight).

Plasticizing hydrocarbon resins are polymers that can be aliphatic, aromatic or combinations of these types, meaning that the polymeric base of the resin may be formed from aliphatic and/or aromatic monomers. These resins can be natural or synthetic materials and can be petroleum based, in which case the resins may be called petroleum plasticizing resins, or based on plant materials. In particular embodiments, although not limiting the invention, these resins may contain essentially only hydrogen and carbon atoms.

The plasticizing hydrocarbon resins useful in particular embodiment of the present invention include those that are homopolymers or copolymers of cyclopentadiene (CPD) or dicyclopentadiene (DCPD), homopolymers or copolymers of terpene, homopolymers or copolymers of $C_5$ cut and mixtures thereof.

Such copolymer plasticizing hydrocarbon resins as discussed generally above may include, for example, resins made up of copolymers of (D)CPD/vinyl-aromatic, of (D)CPD/terpene, of (D)CPD/$C_5$ cut, of terpene/vinyl-aromatic, of $C_5$ cut/vinyl-aromatic and of combinations thereof.

Terpene monomers useful for the terpene homopolymer and copolymer resins include alpha-pinene, beta-pinene and limonene. Particular embodiments include polymers of the limonene monomers that include three isomers: the L-limonene (laevorotatory enantiomer), the D-limonene (dextrorotatory enantiomer), or even the dipentene, a racemic mixture of the dextrorotatory and laevorotatory enantiomers.

Examples of vinyl aromatic monomers include styrene, alpha-methylstyrene, ortho-, meta-, para-methylstyrene, vinyl-toluene, para-tertiobutylstyrene, methoxystyrenes, chloro-styrenes, vinyl-mesitylene, divinylbenzene, vinyl-naphthalene, any vinyl-aromatic monomer coming from the $C_9$ cut (or, more generally, from a $C_8$ to $C_{10}$ cut). Particular embodiments that include a vinyl-aromatic copolymer include the vinyl-aromatic in the minority monomer, expressed in molar fraction, in the copolymer.

Particular embodiments of the present invention include as the plasticizing hydrocarbon resin the (D)CPD homopolymer resins, the (D)CPD/styrene copolymer resins, the polylimonene resins, the limonene/styrene copolymer resins, the limonene/D(CPD) copolymer resins, $C_5$ cut/styrene copolymer resins, $C_5$ cut/$C_9$ cut copolymer resins, and mixtures thereof.

Commercially available plasticizing resins that include terpene resins suitable for use in the present invention include a polyalphapinene resin marketed under the name Resin R2495 by Hercules Inc. of Wilmington, Del. Resin R2495 has a molecular weight of about 932, a softening point of about 135° C. and a glass transition temperature of about 91° C. Another commercially available product that may be used in the present invention includes DERCOLYTE L120 sold by the company DRT of France. DERCOLYTE L120 polyterpene-limonene resin has a number average molecular weight of about 625, a weight average molecular weight of about 1010, an Ip of about 1.6, a softening point of about 119° C. and has a glass transition temperature of about 72° C. Still another commercially available terpene resin that may be used in the present invention includes SYLVARES TR 7125 and/or SYLVARES TR 5147 polylimonene resin sold by the Arizona Chemical Company of Jacksonville, Fla. SYLVARES 7125 polylimonene resin has a molecular weight of about 1090, has a softening point of about 125° C., and has a glass transition temperature of about 73° C. while the SYLVARES TR 5147 has a molecular weight of about 945, a softening point of about 120° C. and has a glass transition temperature of about 71° C.

Other suitable plasticizing hydrocarbon resins that are commercially available include $C_5$ cut/vinyl-aromatic styrene copolymer, notably $C_5$ Cut/styrene or $C_5$ cut/$C_9$ cut from Neville Chemical Company under the names SUPER NEVTAC 78, SUPER NEVTAC 85 and SUPER NEVTAC 99; from Goodyear Chemicals under the name WINGTACK EXTRA; from Kolon under names HIKOREZ T1095 and HIKOREZ T1100; and from Exxon under names ESCOREZ 2101 and ECR 373. Another suitable C5/C9 resin is Oppera 373, also available from Exxon, having a glass transition temperature of 45° C.

Yet other suitable plasticizing hydrocarbon resins that are limonene/styrene copolymer resins that are commercially available include DERCOLYTE TS 105 from DRT of France; and from Arizona Chemical Company under the name ZT115LT and ZT5100.

It may be noted that the glass transition temperatures of plasticizing resins may be measured by Differential Scanning calorimetry (DCS) in accordance with ASTM D3418 (1999). In particular embodiments, useful resins may be have a glass transition temperature that is at least 25° C. or alternatively, at least 40° C. or at least 60° C. or between 25° C. and 95° C., between 40° C. and 85° C. or between 60° C. and 80° C.

The amount of plasticizing hydrocarbon resin useful in any particular embodiment of the present invention depends upon the particular circumstances and the desired result. In particular embodiments, the plasticizing resin may be present in an amount of between 50 phr and 120 phr or alternatively between 60 phr and 110 phr or between 70 phr and 120 phr.

In particular embodiments, the glass transition temperature of the rubber composition may for example be between −35° C. and 0° C. or alternatively between −35° C. and −25° C.

The rubber compositions disclosed herein may be cured with any suitable curing system including a peroxide curing system or a sulfur curing system. Particular embodiments are cured with a sulfur curing system that includes free sulfur and may further include, for example, one or more of accelerators, stearic acid and zinc oxide. Suitable free sulfur includes, for example, pulverized sulfur, rubber maker's sulfur, commercial sulfur, and insoluble sulfur. The amount of free sulfur included in the rubber composition is not limited and may range, for example, between 0.5 phr and 10 phr or alternatively between 0.5 phr and 5 phr or between 0.5 phr and 3 phr. Particular embodiments may include no free sulfur added in the curing system but instead include sulfur donors.

Those embodiments that may be cured with a peroxide curing system may include an organic peroxide as a peroxide curing agent, examples of which may include di-cumyl peroxide; tert-butyl cumyl peroxide; 2,5-dimethyl-2,5 bis (tert-butyl peroxy)hexyne-3; bis(tert-butyl peroxy isopropyl)benzene; n-butyl 4,4'-di(tert-butyl peroxy) valerate; 1,1-di-tert-butylperoxy-3,3,5-trimethylcyclohexane; bis-(tert-butyl peroxy)-diisopropyl benzene; t-butyl perbenzoate; di-tert-butyl peroxide; 2,5-dimethyl-2,5-di-tert-butylperoxide hexane and combinations thereof. The amount of peroxide curing agent useful in particular embodiments is not limited and may range, for example, between 0.1 phr and 10 phr. Particular embodiments may utilize the peroxide at between 0.1 phr and 5 phr or alternatively, between 0.5 and 3.5 phr.

Accelerators are used to control the time and/or temperature required for vulcanization and to improve the properties of the cured rubber composition. Particular embodiments of the present invention include one or more accelerators. One example of a suitable primary accelerator useful in the present invention is a sulfenamide. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Combinations of accelerators are often useful to improve the properties of the cured rubber composition and the particular embodiments include the addition of secondary accelerators.

Particular embodiments may include as a secondary accelerant the use of a moderately fast accelerator such as, for example, diphenylguanidine (DPG), triphenyl guanidine (TPG), diorthotolyl guanidine (DOTG), o-tolylbigaunide (OTBG) or hexamethylene tetramine (HMTA). Such accelerators may be added in an amount of up to 4 phr, between 0.5 and 3 phr, between 0.5 and 2.5 phr or between 1 and 2 phr. Particular embodiments may exclude the use of fast accelerators and/or ultra-fast accelerators such as, for example, the fast accelerators: disulfides and benzothiazoles; and the ultra-accelerators: thiurams, xanthates, dithiocarbamates and dithiophosphates.

Other additives can be added to the rubber compositions disclosed herein as known in the art. Such additives may include, for example, some or all of the following: antidegradants, antioxidants, fatty acids, waxes, stearic acid and zinc oxide. Examples of antidegradants and antioxidants include 6PPD, 77PD, IPPD and TMQ and may be added to rubber compositions in an amount, for example, of from 0.5 phr and 5 phr. Zinc oxide may be added in an amount, for example, of between 1 phr and 6 phr or alternatively, of between 1.5 phr and 4 phr. Waxes may be added in an amount, for example, of between 1 phr and 5 phr.

The rubber compositions that are embodiments of the present invention may be produced in suitable mixers, in a manner known to those having ordinary skill in the art, typically using two successive preparation phases, a first phase of thermo-mechanical working at high temperature, followed by a second phase of mechanical working at lower temperature.

The first phase of thermo-mechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C., more narrowly between 130° C. and 170° C., is reached.

After cooling of the mixture, a second phase of mechanical working is implemented at a lower temperature. Sometimes referred to as "productive" phase, this finishing phase consists of incorporating by mixing the vulcanization (or cross-linking) system (sulfur or other vulcanizing agent and accelerator(s)), in a suitable device, for example an open mill. It is performed for an appropriate time (typically between 1 and 30 minutes, for example between 2 and 10 minutes) and at a sufficiently low temperature lower than the vulcanization temperature of the mixture, so as to protect against premature vulcanization.

The rubber composition can be formed into useful articles, including treads for use on vehicle tires. The treads may be formed as tread bands and then later made a part of a tire or they are formed directly onto a tire carcass by, for example, extrusion and then cured in a mold. As such, tread bands may be cured before being disposed on a tire carcass or they may be cured after being disposed on the tire carcass. Typically a tire tread is cured in a known manner in a mold that molds the tread elements into the tread, including, e.g., the sipes molded into the tread blocks.

It is recognized that treads may be formed from only one rubber composition or in two or more layers of differing rubber compositions, e.g., a cap and base construction. In a cap and base construction, the cap portion of the tread is made of one rubber composition that is designed for contact with the road. The cap is supported on the base portion of the tread, the base portion made of a different rubber composition. In particular embodiments of the present invention the entire tread may be made from the rubber compositions as disclosed herein while in other embodiments only the cap portions of the tread may be made from such rubber compositions.

While the tire treads disclosed herein are suitable for many types of vehicles, including heavy trucks, particular embodiments include tire treads for use on vehicles such as passenger cars and/or light trucks. Such tire treads are also useful for all weather tires and/or snow tires.

The invention is further illustrated by the following examples, which are to be regarded only as illustrations and not delimitative of the invention in any way. The properties of the compositions disclosed in the examples were evaluated as described below and these utilized methods are suitable for measurement of the claimed properties of the present invention.

The properties of the compositions disclosed in the examples were evaluated as described below and these utilized methods are suitable for measurement of the claimed properties of the present invention.

Modulus of elongation (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Dynamic properties (Tg and G*) for the rubber compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa and at a frequency of 10 Hz over a temperature sweep from −60° C. to 100° C. with the temperature increasing at a rate of 1.5° C./min. The shear modulus G* at 60° C. was captured and the temperature at which the max tan delta occurred was recorded as the glass transition temperature, Tg.

Wet braking for a tire mounted on an automobile fitted with an ABS braking system was determined by measuring the distance necessary to go from 50 MPH to 0 MPH upon sudden braking on wetted ground (asphalt concrete). A value greater than that of the control, which is arbitrarily set to 100, indicates an improved result, that is to say a shorter wet braking distance.

Wear resistance of a tire mounted on an automobile was measured by subjecting the tire to actual on-road travel and measuring its wear rate (grams of tread lost per 1000 miles) at between 10,000 and 12,000 miles traveled. A value greater than that of the control, arbitrarily set to 100, indicates an improved result, that is to say less wear rate.

EXAMPLE 1

This example provides the physical characteristics of rubber compositions disclosed herein. Rubber compositions were prepared using the components shown in Table 1. The amount of each component making up the rubber compositions shown are provided in parts per hundred parts of rubber by weight (phr). The polybutadiene was CB22 procured from Lanxess. This polybutadiene had a cis-1.4 content of 98.4%, a number average molecular weight of 160,000 and a weight average molecular weight of 350,000, a polydispersity index (Mw/Mn) of 2.2 and a Mooney viscosity of 63. The SBR had a vinyl content of 57%, cis-1,4 content of 22%, trans-1,4 content of 21% and a styrene content of 26.5%. The SBR was an oil extended rubber so the actual SBR content was 56 phr, the remaining material being the MES oil.

The silica was a ZEOSIL 160, a highly dispersible silica available from Rhodia having a BET of 160 $m^2/g$. The resin was Oppera 373 from Exxon, a C5/C9 petroleum resin having a Tg of 45° C.

The additive package was a typical package including 6PPD, zinc oxide, stearic acid and TMQ. The cure package included accelerators and insoluble sulfur.

The rubber compositions were prepared in a Banbury mixer by mixing the components given in Table 1, except for the cure package, in a mixer until all components were well dispersed and a temperature of between 130° C. and 170° C. was reached. The cure package was added in a second phase on a mill. Curing was effected at 150° C. for forty minutes. The rubber compositions were then prepared for testing and tested to measure their physical properties, the results of which are shown in Table 1.

TABLE 1

Rubber Formulations and Physical Properties

| Formulations | W1 | W2 | F1 |
|---|---|---|---|
| SBR | 62 | | |
| BR, High cis-1.4 | 44 | 100 | 100 |
| Carbon Black, N234 | 42 | 8.6 | 8.6 |
| Silica | 47 | 100 | 100 |
| Silane Coupling Agent | 3.7 | 8 | 8 |
| Oil | 15 | 35 | 0 |
| Resin | 18 | 29 | 73 |
| Additives | 7 | 6.9 | 6.9 |
| Cure Package | 3.6 | 6.4 | 6.4 |
| Physical Properties | | | |
| MA10 @23° C. | 4.5 | 5.1 | 5.2 |
| MA100 @ 23° C. | 1.5 | 1.6 | 1.7 |
| MA300 @ 23° C. | 1.4 | 1.7 | 1.8 |
| Shear Modulus G* @ 60° C., MPa | 1.3 | 1.09 | 1.05 |
| Tg, ° C. | −21.3 | | −32 |

Example 2

TABLE 2

Tire Testing Results

| Formulations | W1 | W2 | F1 |
|---|---|---|---|
| Tire Testing | | | |
| Wear | 100 | 130 | 157 |
| Wet Braking | 100 | 81 | 103 |

This example demonstrates the break in the compromise between wear and wet braking for tires having treads of one embodiment of the present invention. Tires were built with treads formulated from the rubber compositions shown in Table 1. The tires were then tested in accordance with the testing procedures described above. The results of the tire testing are shown in Table 2, normalized to the results obtained with the tires made of the rubber formulation W1.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A tread for a tire, the tread comprising a rubber composition that is based upon a cross-linkable elastomer composition, the cross-linkable elastomer comprising, per 100 parts by weight of rubber (phr):
   100 phr of a polybutadiene rubber having a cis-1,4 bond content of at least 95%;
   between 60 phr and 95 phr of a plasticizing resin having a glass transition temperature of at least 25° C.;
   between 0 phr and 3 phr of a liquid plasticizer; and
   at least 90 phr of a silica reinforcing filler.

2. The tread of claim 1, wherein the rubber composition has a glass transition temperature of between −35° C. and 0° C.

3. The tread of claim 1, wherein the plasticizing resin has a glass transition temperature of between 40° C. and 85° C.

4. The tread of claim 1, wherein the plasticizing resin is a C5-C9 petroleum resin.

5. The tread of claim 1, wherein the tire is an automobile tire.

6. The tread of claim 1, wherein the tire is a light truck tire.

7. A tread for a tire, the tread comprising a rubber composition that is based upon a cross-linkable elastomer composition, the cross-linkable elastomer comprising, per 100 parts by weight of rubber (phr):
   100 phr of a polybutadiene rubber having a cis-1,4 bond content of at least 95%;
   between 60 phr and 95 phr of a plasticizing resin having a glass transition temperature of at least 25° C.;
   between 0 phr and 3 phr of a liquid plasticizer; and
   a reinforcing filler selected from the group consisting of an organic filler, an inorganic filler and combinations thereof.

8. The tread of claim 7, wherein the elastomer comprises at least 90 phr of the reinforcing filler.

9. The tread of claim 7, wherein the reinforcing filler is silica.

10. The tread of claim 7, wherein the rubber composition has a glass transition temperature of between −35° C. and 0° C.

11. The tread of claim 7, wherein the plasticizing resin has a glass transition temperature of between 40° C. and 85° C.

12. The tread of claim 7, wherein the plasticizing resin is a C5-C9 petroleum resin.

13. The tread of claim 7, wherein the tire is an automobile tire.

14. The tread of claim 7, wherein the tire is a light truck tire.

15. The tread of claim 1, wherein the cross-linkable elastomer comprises no liquid plasticizer.

16. The tread of claim 7, wherein the cross-linkable elastomer comprises no liquid plasticizer.

* * * * *